US012256483B2

United States Patent
Hartel

(10) Patent No.: US 12,256,483 B2
(45) Date of Patent: Mar. 18, 2025

(54) TRIGGER MODULE

(71) Applicant: ESAB AB, Gothenburg (SE)

(72) Inventor: Marc A. Hartel, Reiskirchen (DE)

(73) Assignee: ESAB AB, Gothenburg (SE)

( * ) Notice: Subject to any disclaimer, the term of this patent is extended or adjusted under 35 U.S.C. 154(b) by 395 days.

(21) Appl. No.: 17/478,352

(22) Filed: Sep. 17, 2021

(65) Prior Publication Data

US 2023/0092308 A1     Mar. 23, 2023

(51) Int. Cl.
H05H 1/36         (2006.01)

(52) U.S. Cl.
CPC .................................... H05H 1/36 (2013.01)

(58) Field of Classification Search
CPC .... B23K 26/703; B23K 26/082; B23K 26/32; B23K 26/24; B23K 26/28; B23K 26/22; B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20; B23K 26/0066; H05H 1/36
USPC .......... 219/121.48, 121.63, 121.64, 136, 119
See application file for complete search history.

(56) References Cited

U.S. PATENT DOCUMENTS

| | | | |
|---|---|---|---|
| 4,250,366 A | 2/1981 | Erickson et al. | |
| 6,979,799 B2 | 12/2005 | Centner | |
| 6,987,244 B2 | 1/2006 | Bauer | |
| 7,009,145 B2 | 3/2006 | Bauer | |
| 7,800,017 B2 | 9/2010 | Zamuner | |
| 8,283,600 B2 | 10/2012 | Zamuner | |
| 10,945,887 B2 | 3/2021 | Papp et al. | |
| 2009/0078688 A1* | 3/2009 | Giese | B23K 9/295 219/136 |
| 2009/0236325 A1* | 9/2009 | Moreno Gozalbo | B23K 9/323 219/136 |
| 2009/0277891 A1 | 11/2009 | Krupnicki | |
| 2013/0334188 A1* | 12/2013 | Enyedy | B23K 9/1336 219/130.21 |
| 2016/0107257 A1* | 4/2016 | Denis | B23K 9/1006 219/132 |

(Continued)

FOREIGN PATENT DOCUMENTS

| | | | |
|---|---|---|---|
| CN | 102489834 A | 6/2012 | |
| DE | 102013205513 A1 | 10/2013 | |
| EP | 2247403 A1 * | 11/2010 | ............. B23K 9/295 |

(Continued)

OTHER PUBLICATIONS

Notification of Transmittal of International Search Report and Written Opinion including International Search Report and Written Opinion for International Application No. PCT/IB2022/057751 dated Dec. 1, 2022, 17 pages.

*Primary Examiner* — Phuong T Nguyen

(74) *Attorney, Agent, or Firm* — Edell, Shapiro & Finnan, LLC

(57) ABSTRACT

A torch having a replaceable trigger module is disclosed. The trigger module includes a housing defining a cavity; a trigger operatively coupled to the housing; and a printed circuit board (PCB) configured to be electrically coupled to one or more accessories. The PCB and the one or more accessories are disposed at least partially in the cavity and are coupled to the housing so that coupling the housing to a torch handle mechanically couples the PCB and trigger to the torch handle.

15 Claims, 6 Drawing Sheets

(56) References Cited

U.S. PATENT DOCUMENTS

2018/0353330 A1   12/2018   Papp et al.

FOREIGN PATENT DOCUMENTS

| EP | 2247403 B1 | 4/2015 |
| FR | 2045008 A5 | 2/1971 |
| JP | 2000084668 A | 3/2000 |
| JP | 2017189789 A | 10/2017 |
| WO | 2019202854 A | 10/2019 |

* cited by examiner

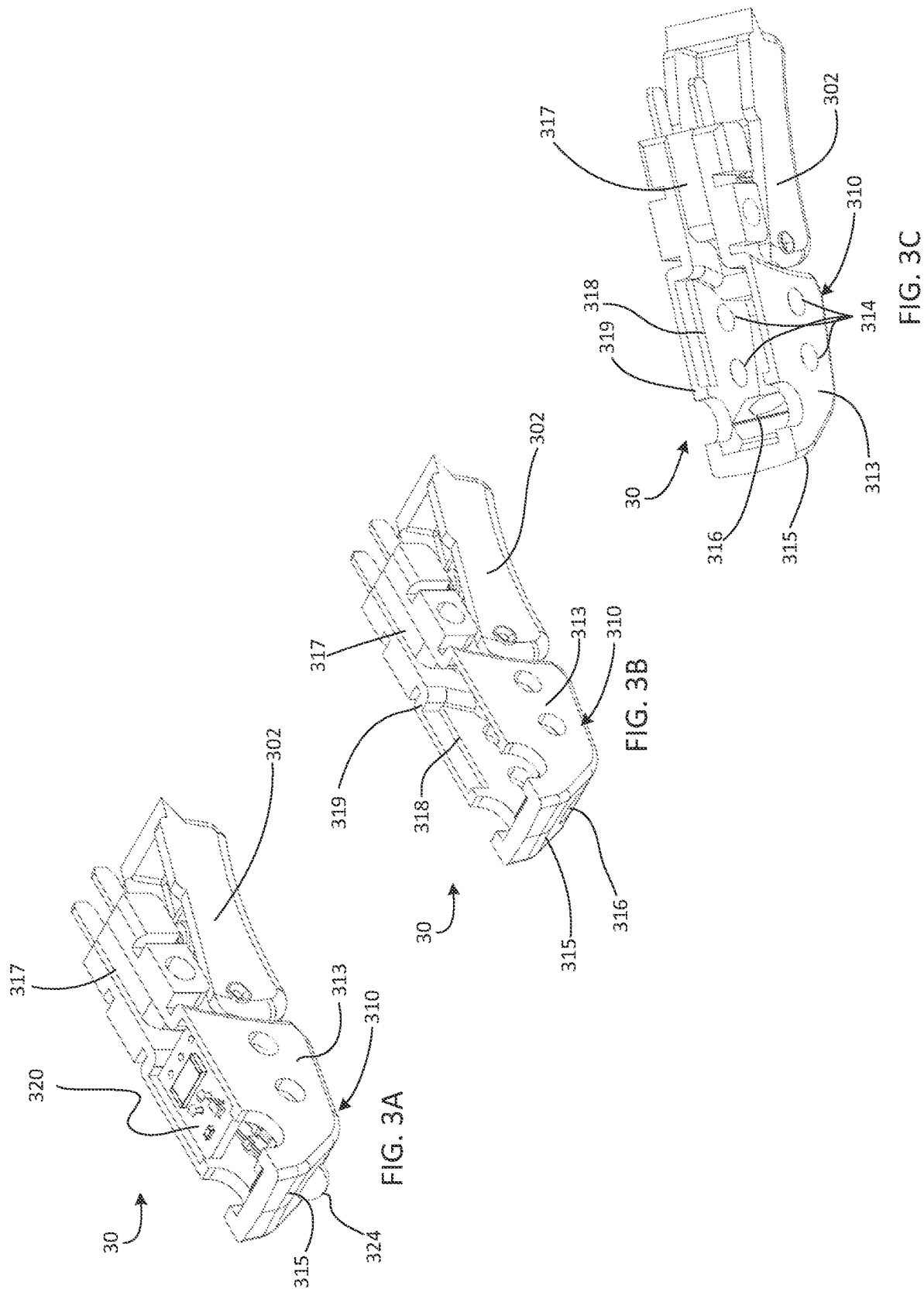

TRIGGER MODULE

FIELD OF INVENTION

The present invention relates to the field of torches and, in particular, a trigger module for a torch.

BACKGROUND

Handheld arc plasma torches (e.g., welding or plasma cutting torches) include a handle assembly and trigger for operating the torch. The trigger can be used to initiate, maintain, and/or terminate a processing operation (e.g., a welding operation or a plasma cutting operation). That is, the trigger may be depressed to cause a desired processing operation to be performed. For example, actuation of the trigger may cause process/shield gas and/or current to flow from a power supply to a torch, and/or cause weld wire to flow from a wire feeder to a torch. The trigger may also initiate other operations related to arc process operations.

Moreover, in many arc processing systems, one or more controllers at the power supply and/or wire feeder controls the flow rate of the process/shield gas, the properties (e.g., amperage) of process current, and/or the feed rate of the weld wire during a processing operation. A user may adjust the parameters via a human to machine interface (HMI) at the power supply, wire feeder, and/or torch. Additionally or alternatively, a torch might include sensors that drive parameter adjustment. Either way, once arc process parameters are set, trigger actuation may initiate and/or terminate a processing operation with a desired set of parameters. However, often, the trigger is part of the handle assembly of the torch and cannot be easily replaced or serviced. Likewise, sensors are often sealed within a torch and cannot be easily accessed for replacement, modification, upgrade, etc.

SUMMARY

The present invention relates to a torch having a trigger module. In accordance with at least one embodiment of the present invention, the torch includes a removable trigger module.

According to an embodiment, the trigger module includes a housing defining a cavity; a trigger operatively coupled to the housing; and a printed circuit board (PCB) configured to be electrically coupled to one or more accessories. The PCB and the one or more accessories are disposed at least partially in the cavity and are coupled to the housing so that coupling the housing to a torch handle mechanically couples the PCB and trigger to the torch handle.

In one form of the trigger module, the trigger is pivotably coupled to the housing.

In one form of the trigger module, the one or more accessories include at least one of a light source, temperature sensor, and a motion sensor. The temperature sensor may be configured to detect a temperature of the torch and generate a signal indicative of the detected temperature. The motion sensor may be configured to generate a signal in response to the torch being moved.

In one form of the trigger module, the PCB includes one or more contacts to electrically couple the PCB to the one or more accessories.

In one form of the trigger module, the PCB is configured to communicate with a control module. The control module may be disposed in or on at least one of the torch and a power supply.

According to another embodiment, a system includes a torch having a handle including a first portion and a second portion; and a trigger module disposed between the first portion and the second portion. The trigger module includes a housing defining a cavity; a trigger operatively coupled to the housing; and a printed circuit board (PCB) configured to be electrically coupled to one or more accessories. The PCB and the one or more accessories are disposed at least partially in the cavity.

In one form of the system, the first portion and the second portion of the handle each include a bracket portion with inner surfaces configured to engage sides of the trigger module. The housing may define a plurality of mounting holes arranged in sidewalls of the housing. The bracket portions may include engagement elements that extend from the inner surface, and the plurality of mounting holes may receive the engagement elements to secure the housing to the handle.

In one form, the system further includes a fastening mechanism for fastening the first portion of the handle to the second portion of the handle. The fastening mechanism comprises at least one of a screw and a tongue and groove arrangement. The tongue and groove arrangement may include one or more tongues disposed in the first portion of the handle and one or more grooves disposed on the second portion of the handle configured to receive the one or more tongues.

In one form of the system, the one or more accessories include at least one of a light source, temperature sensor, and a motion sensor.

In one form of the system, the trigger module includes shoulders disposed on inner surfaces of the housing, the shoulders configured to receive the PCB.

In one form of the system, the one or more accessories include a light source and the PCB is configured to activate the light source in response to receiving a signal indicative of start-up of a power supply connected to the torch. The PCB may be further configured to deactivate the light source in response to receiving a signal indicative of the trigger activating a cutting or welding operation of the torch.

According to yet another embodiment, a torch includes a handle having a first half and a second half; and the first half and the second half each include a bracket portion defining a cavity for receiving a trigger module. The torch is configured to be electrically coupled to a first type of trigger module or a second type of trigger module.

In one form of the torch, the first type of trigger module includes a trigger for initiating and terminating a processing operation.

In one form of the torch, the second type of trigger module includes a trigger for initiating and terminating a processing operation and a printed circuit board electrically coupled to at least one of a light source, a temperature sensor, and a motion sensor.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures:

FIG. 3A is a perspective view of the trigger module having an electrical component according to an embodiment.

FIG. 3B is a perspective view of the trigger module of FIG. 3A with the electrical component removed.

FIG. 3C is a top perspective view of the trigger module of FIG. 3B.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Many typical torches for a processing operation (e.g., welding operation or plasma cutting operation) include a trigger that is integrally coupled to the torch. As such, if the trigger were to become worn or otherwise non-functioning, the entire torch is rendered inoperable. Additionally, as new functionalities become available, conventional torches typically cannot be retrofitted to accommodate an accessory for performing the new functionality. Rather, a user generally purchases a new torch with the desired functionality. Moreover, in different environments different functionalities may be desirable. Consequently, a user typically purchases a torch with the desired functionality for each environment in which the torch will be used. Accordingly, a torch that overcomes these issues is desirable.

Generally, a torch, as presented herein, includes a trigger module that is removably coupled to the torch. Consequently, the trigger module may be easily replaced or swapped for a different type of trigger module. The different types of trigger modules may include different accessories (e.g., based on the torch type) and, thus, different trigger modules may add different functionalities to the torch. For example, the trigger module includes a housing defining a cavity for receiving an accessory such as a light source, a temperature sensor, and/or a motion sensor. Regardless of the accessories included in the trigger module, electrically coupling the trigger module to the torch allows the trigger to activate a processing operation and also couples the one or more accessories to the torch. Accordingly, a user can select a type of trigger module based on desired functionality of the torch and install a trigger module corresponding to the desired functionality. Further, the user can replace worn or otherwise non-functioning trigger modules without replacing the entire torch.

Figure 1A:
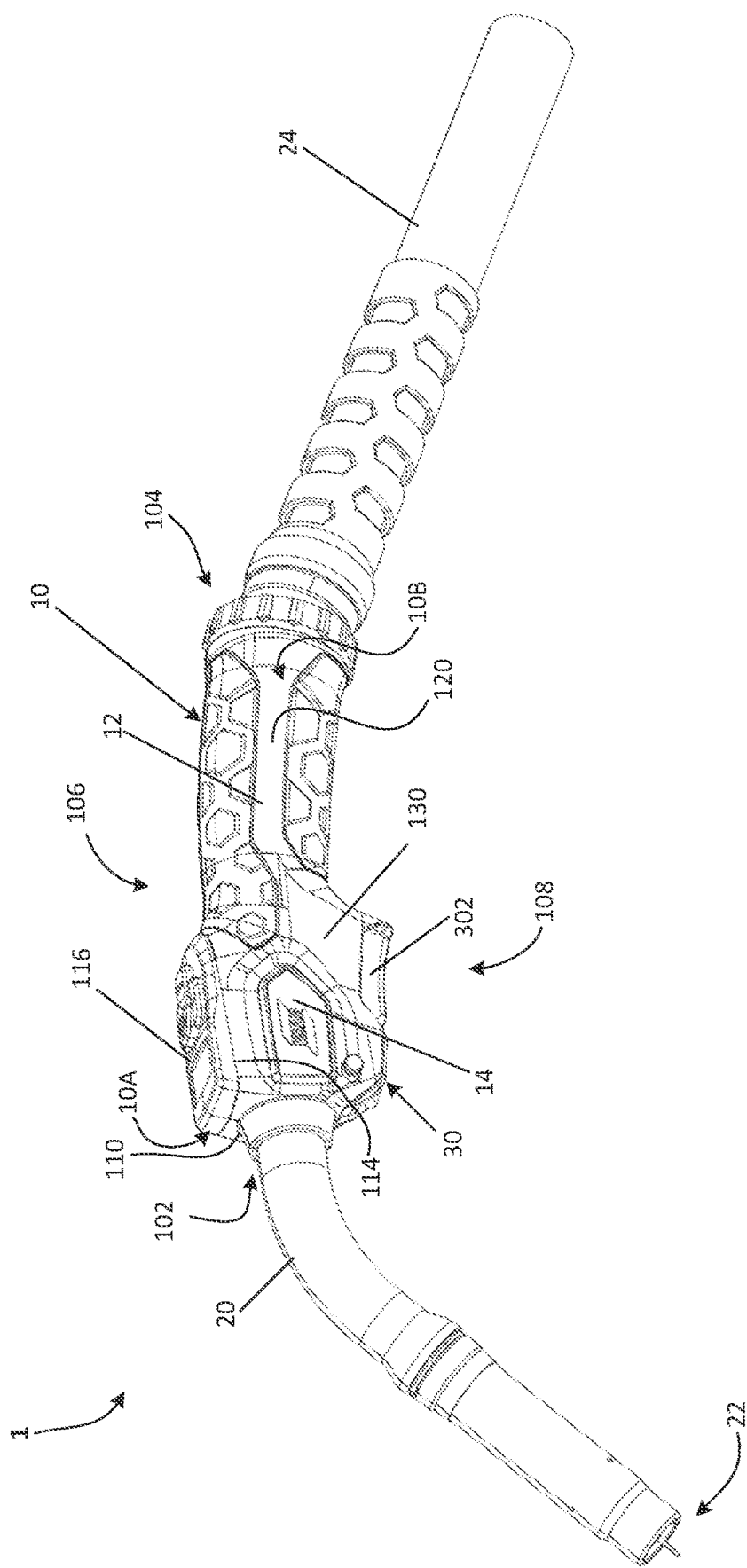
FIG. 1A is a perspective view of a torch, according to an embodiment.
Figure 1B:
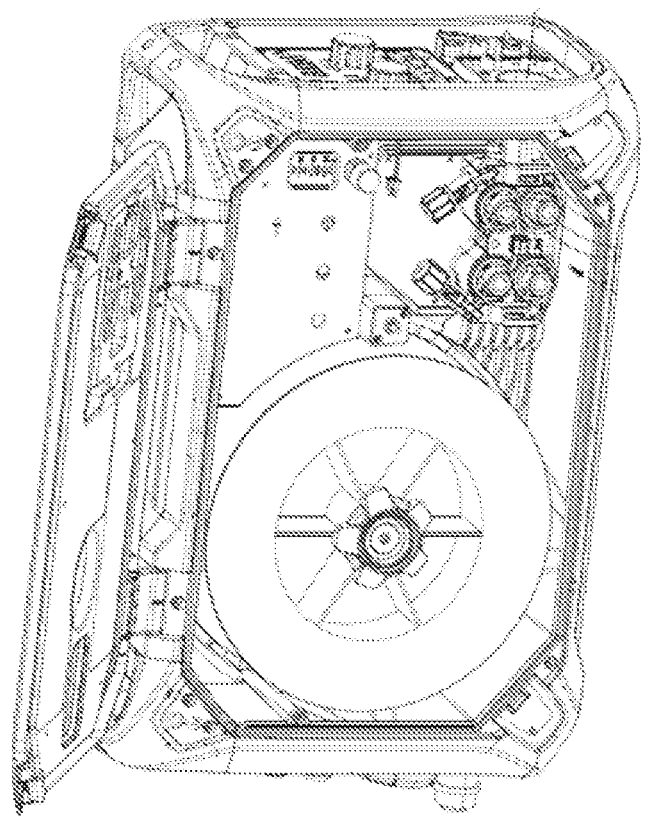
FIG. 1B is a perspective view of a power supply according to an embodiment.

Now referring to FIGS. 1A and 1B, a torch 1 and power supply 2 according to an exemplary embodiment are described. The torch 1 includes a handle 10, torch neck 20, and a trigger module 30 having a trigger 302. The handle 10 has a front end 102 and back end 104 opposite the front end 102. The torch neck 20 extends from the front end 102 to a torch tip 22. A cable 24 is connected to the handle 10 at the back end 104, and is configured to electrically and fluidly couple the torch 1 to the power supply 2 and/or any other arc processing system components. For example, the cable 24 is configured to conduct control signals, process current, weld wire, and/or one or more fluids (e.g., process gas, shield gas, cooling fluid) between the torch 1 and the power supply 2. The cable 24 may include one or more conduits and a plurality of conductors. The one or more conduits direct the one or more fluids between the torch 1 and the power supply 2. Weld wire may also be fed through the one or more conduits from the power supply 2 to the torch 1. The plurality of conductors conduct the one or more control signals and a process current between the torch 1 and the power supply 2.

In some implementations, the power supply 2 may be or include a wire feeder. In another implementation, the power supply 2 may be electrically coupled to a wire feeder which, in turn, transmits and/or receives process current and/or control signals to the torch 1 via the cable 24.

Referring to FIG. 1A, the handle 10 includes a top 106 and a bottom 108, and is defined by a first half or clam shell portion 110 and a second half or clam shell portion 120. Specifically, in the depicted embodiment, the handle 10 is vertically bisected between a first side 10A and a second side 10B into two portions 110 and 120. The first and second clam portions 110 and 120 may attach to each other via one or more fastening mechanisms. For example, one or more screws may extend laterally to hold the portions 110 and 120 together. Additionally, or alternatively, a tongue and groove arrangement, clips, or snap fit arrangement may mechanically fasten the two clam shell portions 110 and 120 together. Moreover, in other embodiments, clam shell portions 110 and 120 need not be unitary and may be formed from any number of pieces or portions, which may be fixedly or removably coupled together.

The handle 10 further includes a grip portion 12 and a main body portion 14. The grip portion 12 has a generally cylindrical shape and is configured to be gripped by a user during operation. The main body portion 14 includes a control module seat 114 for receiving a control module 116, and a receiving portion 130 that protrudes towards the bottom 108 of the torch 1. The receiving portion 130 is configured to receive and retain the trigger module 30. Said another way, the trigger module 30 is clamped between the first and second clam shell portions 110 and 120 at the receiving portion 130. Removing one of the first or second clam shell portions 110 and 120 releases the trigger module 30 enabling the replacement of the trigger module 30. In the depicted embodiment, the receiving portion 130 also includes an attachment bolt 146 (see FIG. 2C) configured to receive and secure a pistol grip adapter (not shown) to the torch handle 10. However, in some implementations, the torch handle 10 does not include the attachment bolt 146.

Figure 2A:
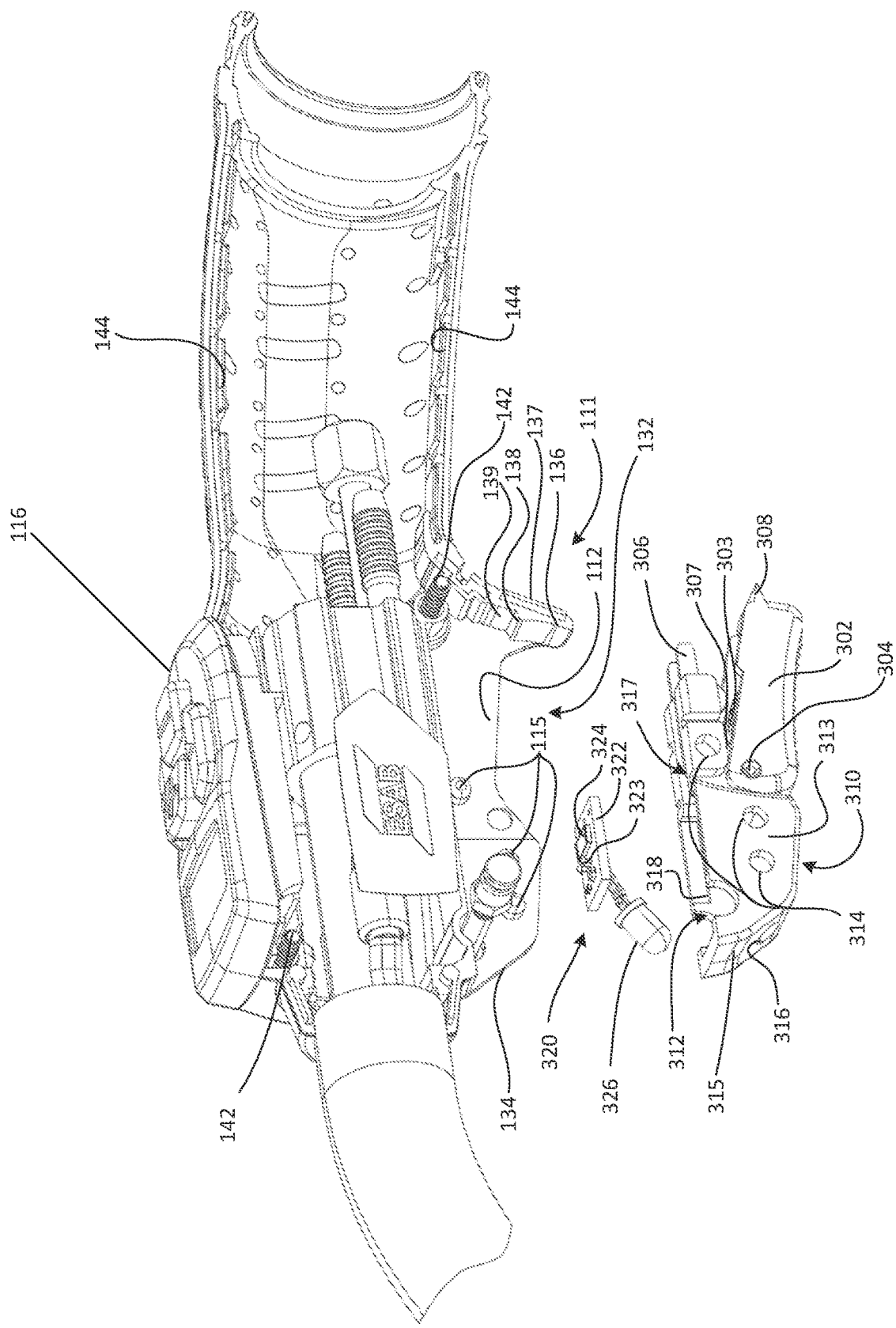
FIG. 2A is an exploded view of the torch of FIG. 1A with a clam shell portion removed.
Figure 2B:
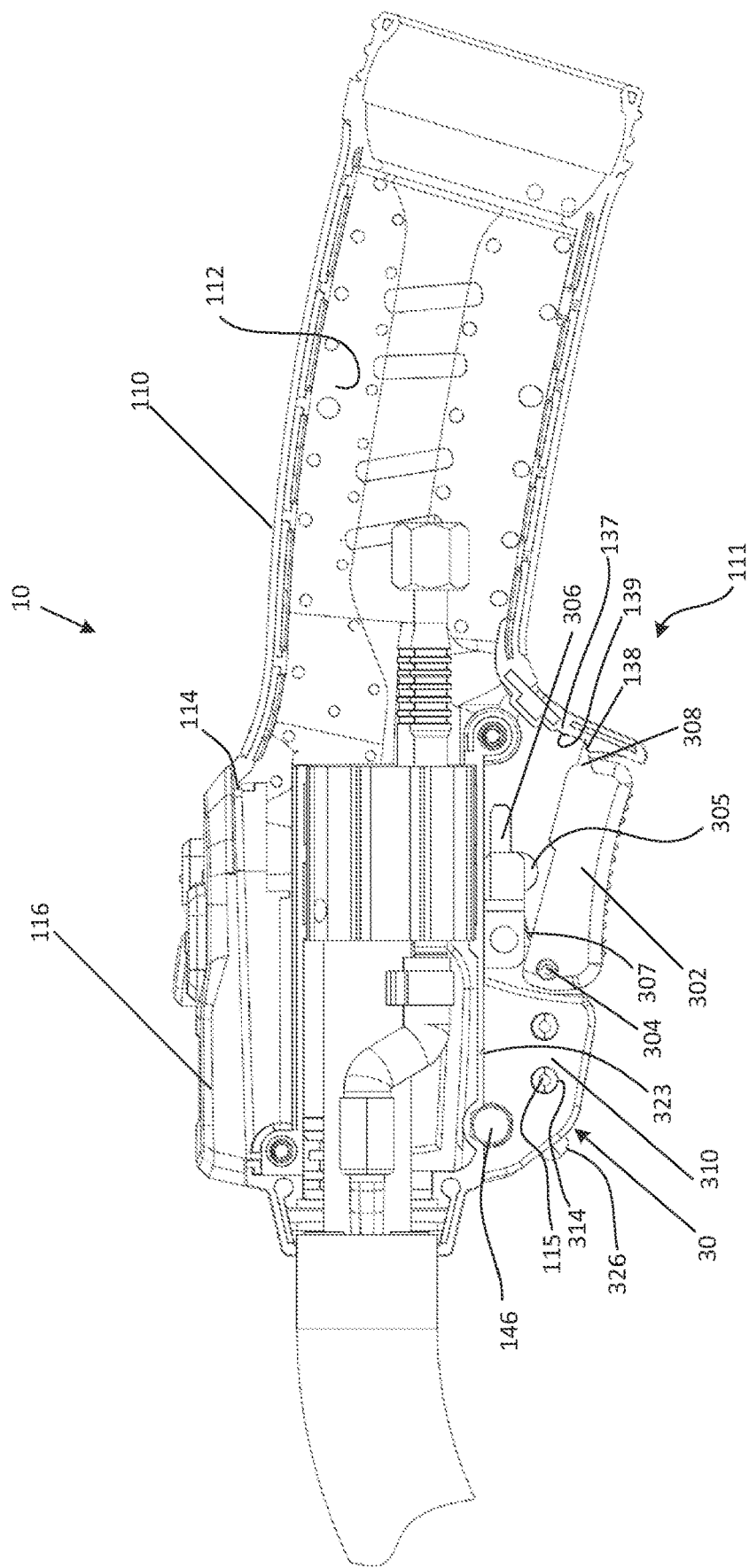
FIG. 2B is a side view of the torch of FIG. 1A with the clam shell portion removed.
Figure 2C:
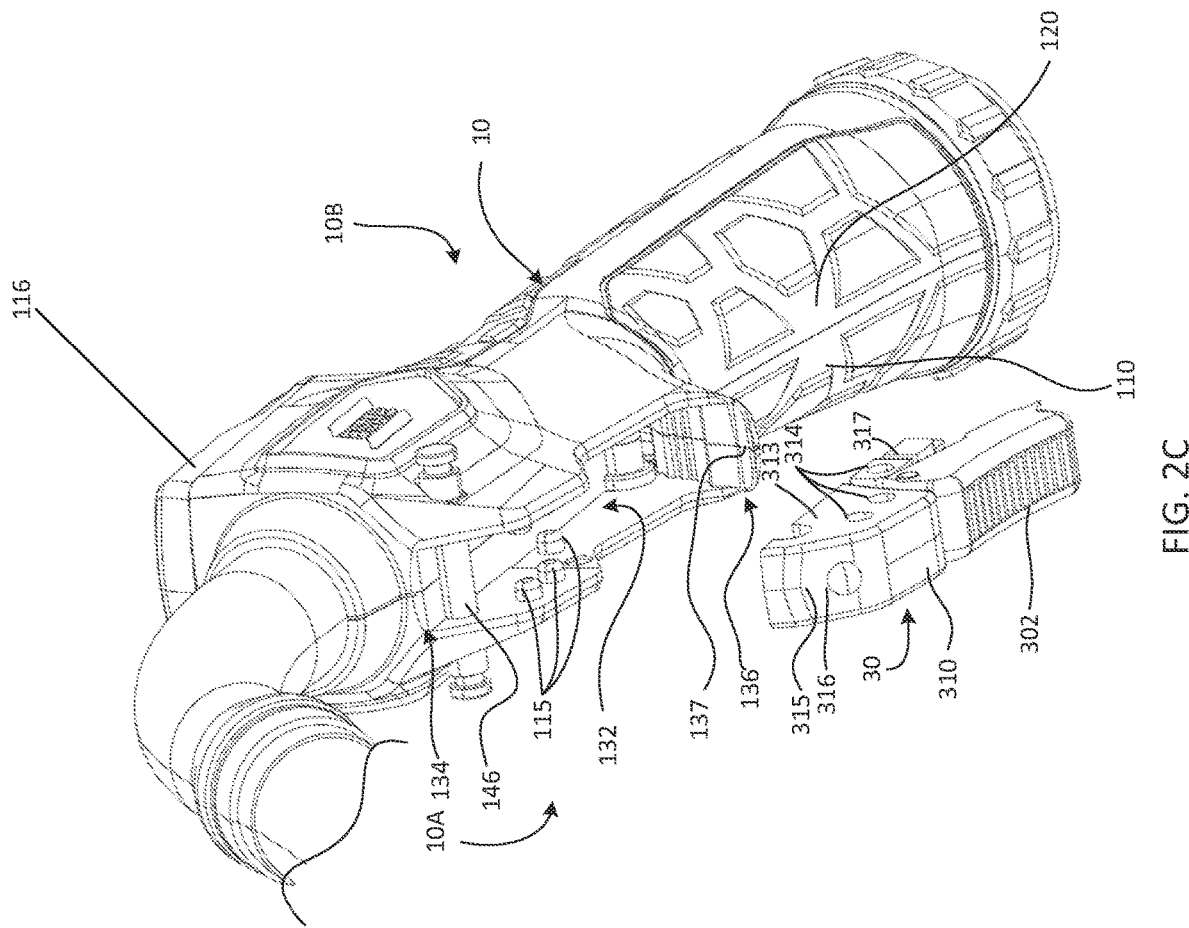
FIG. 2C is a bottom, partially exploded, view of the torch of FIG. 1A.

An exploded view and a side view of the torch 1 with the second clam shell portion 120 removed are illustrated in FIGS. 2A and 2B, respectively. A bottom, partially exploded, view of the torch 1 is illustrated in FIG. 2C. As shown in FIGS. 2A-2C, the handle 1 includes a plurality of bolts or screws 142 and tongues 144 for fastening the first clam shell portion 110 to the second clam shell portion 120. Additionally, the first clam shell portion 110 includes a bracket portion 111 having an inner surface 112. Although not shown, the second clam shell portion 120 includes a plurality of grooves or recess for receiving the tongues 144 and a bracket portion that corresponds to bracket portion 111.

The bracket portions 111 of clam shell portions 110 and 120 cooperate to define the receiving portion 130 and a cavity 132 for receiving the trigger module 30. The cavity 132 includes a front portion 134 and a back portion 136 (see FIG. 2C). The back portion 136 of the cavity 132 is defined by a trigger plate 137. The trigger plate 137 includes a trigger step or stop 138 and a trigger race 139 (see FIG. 2A). The trigger 302 may travel along trigger race 139 and is constrained by the trigger step 138. That is, the trigger step 138 prevents the trigger 302 from over extending. In some implementations, the trigger plate 137 may include additional steps to lock the trigger 302 in a desired orientation (e.g., in an engaged position) such that the trigger 302 may remain engaged while a user removes their finger(s) from the trigger 302.

To retain the trigger module 30 generally within the cavity 132, the receiving portion 130 includes a plurality of engagement elements. For example, the inner surface 112 of the bracket portion 111 includes a plurality of mounting posts 115 extending inwards (e.g., laterally or substantially perpendicular to the inner surface 112). A corresponding set of mounting posts 115 are also disposed on an inner surface of the second clam shell portion 120. Collectively, the mounting posts 115 engage receiving elements of the trigger module 30 when received in the cavity 132, thereby holding the trigger module 30 in place. That is, trigger module 30 is clamped between bracket portions 111 of the receiving portion 130 and the mounting posts 115 engage the receiving elements to lock the trigger module 30 in the cavity 132. In the depicted embodiment, the mounting posts 115 are generally cylindrical and extend perpendicularly from the inner surface 112, but embodiments are not limited thereto. For example, in other embodiments, the mounting posts 115 may be any shape (e.g., triangle, pentagon, hexagon, heptagon, octagon, star, or any other polygonal shape).

As shown in FIG. 2A, the trigger module 30 includes the trigger 302, and a housing 310. The housing 310 includes a cavity 312 defined by sidewalls 313, a front wall 315, and a tail portion 317. The sidewalls 313 and the tail portion 317 include a plurality of receiving elements or mounting holes 314 configured to receive the mounting posts 115 of the bracket portions 111. The trigger 302 is pivotably coupled to the tail portion 317 via a pivot 304. The pivot 304 may be a pin extending through the trigger 302 and tail portion 317. A resilient element 307 may bias the trigger 302 from the tail portion 317. For example, the resilient member may be a coil spring disposed between the trigger 302 and tail portion 317 or a torsional spring disposed along the pivot 304.

When the trigger module 30 is received in the cavity 132, the bracket portions 111 of the first and second halves 110 and 120 of the torch handle 10 clamp onto the housing 310 and the mounting posts 115 lock the trigger module 30 within the cavity 132. To lock the trigger module 30, the mounting posts 115 engage the mounting holes 314 in the sidewalls 313 of the housing 310. That is, the mounting posts 115 extend through the mounting holes 314. Consequently, the mounting posts 115 in conjunction with the mounting holes 314 prevent the torch module 30 from moving after being received in the cavity 132 and clamped by bracket portions 111 of the first and second halves 110 and 120.

The trigger module 30 may further include a trigger contact 303, a housing contact 305, and trigger terminals 306. The housing contact 305 and the trigger terminals 306 are disposed at the tail portion 317, and the trigger contact 303 is disposed on the trigger 302, opposite the housing contact 305. The terminal 306 electrically couples the torch module 30 to electronics in the torch 1 (not shown, for clarity), which may couple the torch module 30 to the power supply 2 via the cable 24. When the contacts 303 and 305 touch, a circuit between the torch 1 and the power supply 2 may be completed and a signal indicative of activation of the torch may be generated (e.g., to be transmitted to the power supply). In some implementations, the housing contact 305 may detect how far and/or hard the trigger 302 is pressed. Thus, the signal generated and transmitted by the torch module 30 may vary depending upon how far and/or hard the trigger 302 is pressed. Consequently, one or more process parameters (e.g., wire feed speed, process gas flow rate, current, etc.) may vary in response to the transmitted signal.

The trigger 302 further includes a trigger lock 308 configured to engage the trigger step 138. As best shown in FIG. 2B, the trigger lock 308 travels along the trigger race 139 in response to being actuated. The generated signal may correspond to the position of the trigger lock 308 along the trigger race 139. The contacts 303 and 305 may detect the position of the trigger lock 308 along the trigger race 139 and adjust the signal accordingly.

In some implementations, the trigger lock 308 in conjunction with an additional trigger step (not shown) disposed along the trigger race 139 may lock the trigger 302 in a desired orientation. During operation, the user may depress the trigger 302 until the trigger lock 308 engages additional steps (not shown) to lock the trigger 302 in the desired position to activate the torch 1 and/or set the process parameters at a desired level. The user may then release the trigger 302 and continue using the torch 1 without terminating the process and/or changing the process parameters. That is, although the user releases pressure from the trigger 302, the trigger 302 remains at the desired position due to the trigger lock 308 engaging the additional step. The user may release or unlock the trigger 302 by depressing the trigger 302 again to disengage the trigger 302 from the additional stop. The trigger 302 may then return to its resting/disengaged position by resting on trigger step 138. Alternatively, a first trigger actuation may initiate arc process operations with certain parameters and a second trigger actuation may terminate the arc process operations without requiring trigger depression therebetween.

In at least some embodiments, the trigger module 30 further includes an electrical component 320 disposed substantially in the cavity 312 of the housing 310. The electrical component 320 may include a printed circuit board (PCB) 322, one or more accessories such as one or more electrical modules 324, and/or a light source 326. The light source 326 is configured to emit a light at the torch tip 22 to illuminate a location of a desired weld or cut. The one or more electrical modules 324 and the light source 326 are electrically coupled to the PCB 322. The PCB 322 may be electrically coupled to the power supply 2, terminals 306, contacts 303 and 305, and/or the control module 116 via PCB contacts 323. For example, the contacts 323 may be attached to internal wiring or circuitry (not shown) of the torch 1 and/or cable 24. Consequently the PCB 322 is configured to communicate with (and/or provide communication between) the trigger 302, the one or more electrical modules 324, and/or a control module at the torch 1 and/or power supply 2.

As illustrated in FIG. 3A, the electrical component 320 is received in the cavity 312 of the housing 310 of the trigger module 30. The housing 310 cradles the electrical component 320 and prevents it from moving within the cavity 312. The light source 326 extends from the PCB 322 to the front wall 315 and partially through a front-facing hole 316 in the front wall 315.

As shown in FIGS. 3B and 3C, the housing 310 includes platforms or shoulders 318 disposed at an interior surface of the sidewalls 313 below a top surface 319 of the housing 310. The shoulders 318 cradle the PCB 322 within the housing 310. The shoulders 318 may be spaced from the top surface 319 by a thickness of the PCB 322. Thus, a majority of the PCB 322, including any electrical modules 324, is disposed at or below the top surface 319 of the housing 310 when received by the shoulders 318. In some implementations, the PCB contacts 323 may extend beyond the top surface 319 to electrically couple to the torch 1, the control module 116, the power supply 2, and/or other components. In some implementations, an adhesive may be applied to the shoulders 318 and/or the PCB 322 to bond the PCB 322 to the housing 310.

During operation, the PCB 322 may control an ancillary function based on operation of the torch 1, and/or trigger module 30. For example, the one or more electrical modules 324 may include a controller, a temperature sensor, motion sensor, and/or another component configured to provide an ancillary function based on operation of the torch 1. In one implementation, the one or more electrical modules 324 may control the light source 326 (e.g., an LED) based on the state of the torch 1 and power supply 2. For example, the one or more electrical modules 324 may detect that the torch 1 and/or power supply 2 are in a ready state, but not actively performing a processing operation. In some instances, the torch may be in a ready state when the power supply 2 is powered on and ready to provide power to the torch 1 (e.g., after a start-up of the power supply 2), but the trigger 302 has not been actuated to perform a weld or plasma cutting operation. In response to detecting the ready state, the one or more electrical modules 324 may activate the light source 326.

Additionally, or alternatively, the one or more electrical modules 324 may detect that the trigger 302 has been actuated and determine that a process operation is being performed. In other words, the one or more electrical modules 324 may detect that the torch 1 and/or the power supply 2 are in a powered state. In response to determining the torch 1 and/or the power supply 2 are in a powered state, the one or more electrical modules 324 may deactivate the light source 326. Then, after performing a process operation the one or more electrical modules 324 may control the light source to reactivate the light source 326. That is, one or more electrical modules 324 may detect that the torch 1 or power supply 2 have changed from a powered state to a ready state and activate the light source 326 in response to the detected change in state. In at least some embodiments, a ready state and powered state may be detected based on a combination of power parameters and motion data generated by a motion sensor installed in the trigger module 30.

In some implementations, the one or more electrical modules 324 may include a temperature sensor to detect a temperature of the handle 10, and generate and transmit a signal to the power supply 2 and/or control module 116 indicative of the sensed temperature. By sensing a torch temperature at the handle 1, a controller at the torch 1 and/or power supply 2 may detect an overheat condition sooner than a conventional system that detects a temperature of a cooling fluid as it returns to the power supply 2.

Additionally, or alternatively, the one or more electrical modules 324 may include a motion sensor for detecting movement of the torch 1 and transmitting a signal indicative of movement of the torch 1. For example, the motion sensor may detect movement of the torch 1 caused by a user picking up the torch 1, and generate and transmit the signal indicative of movement of the torch 1 to a controller disposed in at least one of the torch 1 and power supply 2.

Accordingly, the trigger module 30 may include an electrical component 320 configured to perform one or more of a lighting function, a temperature sensing function, and/or a motion sensing function. Further, in some implementations, the trigger module 30 may not include an electrical component 320. Based on a desired function, a user can swap out a first trigger module with no additional functionality for a second trigger module with one or more of a lighting functionality, a temperature sensing functionality, and/or a motion sensing functionality. Therefore, a user can repair, upgrade or downgrade a torch by swapping a first module with a second module. Put another way, a user can create different stock-keeping units "SKUs" of torches by interchanging trigger modules (as opposed to interchanging entire torches).

In some implementations, the first and second modules are of a substantially same type. That is, they are capable of performing the same functions. That is, the first trigger module and the second trigger module can be configured to have the same functions. Thus, a user may repair a torch 1 by replacing a malfunctioning first trigger module of a first type with a second trigger module of a same type as the first trigger module.

In some implementations, the first and second modules are of different types. That is, the available functionalities of the first module is not the same as the functionalities of the second module. For example, the first trigger module may have just a trigger with contacts for detecting whether the trigger is depressed. Meanwhile, the second trigger module may include a trigger having contacts, similar to the first trigger, but also include one or more accessories for additional functionalities that are not included in the first trigger module.

Additionally, or alternatively, the first trigger module may include one or more additional functionalities, and the second trigger module may include one or more different additional functionalities or no additional functionalities.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the torch 1 and trigger module 30 described herein, or portions thereof may be fabricated from any suitable material or combination of materials, such as plastic, foamed plastic, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions and/or other characteristics (e.g., time, pressure, temperature, distance, etc.) of an element, operations, conditions, etc. the phrase 'between X and Y' represents a range that includes X and Y.

For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment.

Further, the present disclosure may repeat reference numerals and/or letters in the various examples. This repetition is for the purpose of simplicity and clarity and does not in itself dictate a relationship between the various embodiments and/or configurations discussed.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, outlet, inlet, valve, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

The invention claimed is:

1. A trigger module for a torch comprising:
 a housing defining a cavity;
 a trigger operatively coupled to the housing;
 one or more accessories, the one or more accessories include at least one of a light source, temperature sensor, or a motion sensor; and
 a printed circuit board (PCB) configured to be electrically coupled to the one or more accessories, wherein the PCB and the one or more accessories are disposed at least partially in the cavity and coupled to the housing so that coupling the housing to a torch handle mechanically couples the PCB and trigger to the torch handle, wherein the housing is removable from the torch handle whereby removal of the housing results in the trigger, the one or more accessories, and the PCB being separated from the torch handle.

2. The trigger module of claim 1, wherein the trigger is pivotably coupled to the housing.

3. The trigger module of claim 1, wherein the temperature sensor is configured to detect a temperature of the torch and generate a signal indicative of the detected temperature.

4. The trigger module of claim 1, wherein the motion sensor is configured to generate a signal in response to the torch being moved.

5. The trigger module of claim 1, wherein the PCB comprises one or more contacts to electrically couple the PCB to the one or more accessories.

6. The trigger module of claim 1, wherein the PCB is configured to communicate with a control module.

7. The trigger module of claim 6, wherein the control module is disposed in or on at least one of the torch and a power supply.

8. A system comprising:
 a torch having a handle comprising a first portion and a second portion; and
 a trigger module disposed between the first portion and the second portion, the trigger module having:
  a housing defining a cavity;
  a trigger operatively coupled to the housing;
  one or more accessories, the one or more accessories include at least one of a light source, temperature sensor, or a motion sensor; and
  a printed circuit board (PCB) configured to be electrically coupled to the one or more accessories, wherein the PCB and the one or more accessories are disposed at least partially in the cavity, and wherein the housing is removable from the torch handle whereby removal of the housing results in the trigger, the one or more accessories, and the PCB being separated from the torch handle.

9. The system of claim 8, wherein each of the first portion and the second portion of the handle includes a bracket portion with an inner surface configured to engage sides of the trigger module.

10. The system of claim 9, wherein the housing defines a plurality of mounting holes arranged in sidewalls of the housing, each of the bracket portions includes engagement elements that extend from its inner surface, and the plurality of mounting holes receive the engagement elements to secure the housing to the handle.

11. The system of claim 8, further comprising a fastening mechanism for fastening the first portion of the handle to the second portion of the handle, wherein the fastening mechanism comprises at least one of a screw and a tongue and groove arrangement.

12. The system of claim 11, wherein the tongue and groove arrangement comprises one or more tongues disposed in the first portion of the handle and one or more grooves disposed on the second portion of the handle configured to receive the one or more tongues.

13. The system of claim 8, wherein the trigger module includes shoulders disposed on inner surfaces of the housing, the shoulders configured to receive the PCB.

14. The system of claim 8, wherein the one or more accessories include a light source and the PCB is configured to activate the light source in response to receiving a signal indicative of start-up of a power supply connected to the torch.

15. The system of claim 14, wherein the PCB is further configured to deactivate the light source in response to receiving a signal indicative of the trigger activating a cutting or welding operation of the torch.

* * * * *